(12) United States Patent
Sheahan

(10) Patent No.: US 10,110,526 B1
(45) Date of Patent: Oct. 23, 2018

(54) WEBSITE VISITOR COMMUNICATION SYSTEM WITH ASYNCHRONOUS ONE-WAY VIDEO CHANNEL

(71) Applicant: Andrew Sheahan, Oviedo, FL (US)

(72) Inventor: Andrew Sheahan, Oviedo, FL (US)

( * ) Notice: Subject to any disclaimer, the term of this patent is extended or adjusted under 35 U.S.C. 154(b) by 0 days.

(21) Appl. No.: 15/786,553

(22) Filed: Oct. 17, 2017

(51) Int. Cl.
*G06F 15/16* (2006.01)
*H04L 12/58* (2006.01)
*H04L 29/06* (2006.01)

(52) U.S. Cl.
CPC ............ *H04L 51/046* (2013.01); *H04L 51/10* (2013.01); *H04L 51/36* (2013.01); *H04L 65/4076* (2013.01)

(58) Field of Classification Search
CPC ... H04L 29/06; H04L 65/602; H04L 65/1076; H04L 12/16; H04L 12/18; H04L 12/28; H04L 12/2838; H04L 12/1831; H04L 12/2803
See application file for complete search history.

(56) References Cited

U.S. PATENT DOCUMENTS

| | | | |
|---|---|---|---|
| 6,831,899 B1* | 12/2004 | Roy | H04L 12/1818 370/260 |
| 2007/0050452 A1* | 3/2007 | Raju | H04L 12/1813 709/204 |
| 2009/0153646 A1* | 6/2009 | Bourguignon | G06Q 30/02 348/14.11 |
| 2016/0173825 A1* | 6/2016 | Polyakov | H04N 7/155 348/14.03 |

* cited by examiner

*Primary Examiner* — Farzana B Huq
(74) *Attorney, Agent, or Firm* — Cygnet IP Law, P.A.; Stephen W. Aycock, II

(57) ABSTRACT

Some implementations can include a computer-implemented method and/or system for a website visitor communication system having an asynchronous one-way outbound (i.e., website to visitor) video channel and an inbound (i.e., visitor to website) text channel. The asynchronous aspect of the outbound video channel can permit a representative for the website (or representative) to carry on multiple chat sessions with different visitors simultaneously.

19 Claims, 11 Drawing Sheets

WEBSITE VISITOR COMMUNICATION SYSTEM WITH ASYNCHRONOUS ONE-WAY VIDEO CHANNEL

RELATED APPLICATIONS

This application claims the benefit of U.S. Provisional Application No. 62/409,364, entitled "Website Visitor Communication System with Asynchronous One-Way Video Channel," and filed on Oct. 17, 2016, which is incorporated herein by reference in its entirety.

FIELD

Some implementations relate to website visitor communication systems, and in particular, to a website visitor communication system having an asynchronous one-way outbound video channel and an inbound text channel.

BACKGROUND

Visitors to websites may desire to receive information, answers to specific questions, and/or get a better comfort level with an entity operating the website. Live interaction may be desired by the business, but website visitors may wish to preserve anonymity or may be hesitant to engage in audio or video conversation due to surroundings, appearance, etc.

A need may exist to provide website visitors with a communication system that permits a representative of the entity operating the website to provide video communications to the visitor while permitting the visitor to provide communications to the representative in a form other than video (e.g., text messaging).

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Some implementations can include a computer-implemented method to provide a website visitor communication system having an asynchronous one-way outbound video channel and an inbound text channel. The method can include receiving an indication of a chat request from a website visitor, and causing a representative user interface to be displayed on a representative system. The method can also include causing an asynchronous one-way video communication interface to be displayed to the website visitor, wherein the asynchronous one-way video communication interface permits the website visitor to provide text messages and does not require video messages from the website visitor, and receiving a text message from the asynchronous one-way video communication interface. The method can further include displaying the text message on the representative user interface, and providing user interface control elements on the representative user interface to permit recording and transmitting of a video response to the text message.

The method can also include receiving a recorded video response to the text message from the representative user interface, and transmitting the recorded video response to the asynchronous one-way video communication interface.

The method can further include causing the recorded video response to be played on the asynchronous one-way video communication interface when the website visitor selects a user interface element to play the recorded video response in the asynchronous one-way video communication interface.

The method can also include recording both sides of a conversation between the asynchronous one-way video communication interface and the representative user interface. The recording can be initiated in response to selection of a user interface element corresponding to recording the conversation. The recording can be initiated automatically when the conversation begins.

The method can also include providing a user interface control to permit the representative user interface to transmit a link to the recording of both sides of the conversation between the asynchronous one-way video communication interface and the representative user interface to another user. The indication of the chat request can be received in response to selection of a chat request user interface element within a website visitor communication user interface. The chat request user interface element can be selectable by a website visitor only during a predetermined time period.

Some implementations can include a system comprising one or more processors coupled to a non-transitory computer readable medium having stored thereon software instructions that, when executed by the one or more processors, cause the one or more processors to perform operations. The operations can include receiving an indication of a chat request from a website visitor, and causing a representative user interface to be displayed on a representative system. The operations can also include causing an asynchronous one-way video communication interface to be displayed to the website visitor, wherein the asynchronous one-way video communication interface permits the website visitor to provide text messages and does not require video messages from the website visitor, and receiving a text message from the asynchronous one-way video communication interface. The operations can further include displaying the text message on the representative user interface, and providing user interface control elements on the representative user interface to permit recording and transmitting of a video response to the text message. The operations can also include receiving a recorded video response to the text message from the representative user interface, and transmitting the recorded video response to the asynchronous one-way video communication interface. The operations can further include causing the recorded video response to be played on the asynchronous one-way video communication interface when the website visitor selects a user interface element to play the recorded video response in the asynchronous one-way video communication interface.

The operations can also include recording both sides of a conversation between the asynchronous one-way video communication interface and the representative user interface. The recording can be initiated in response to selection of a user interface element corresponding to recording the conversation. The recording can be initiated automatically when the conversation begins. The operations can further include providing a user interface control to permit the representative user interface to transmit a link to the recording of both sides of the conversation between the asynchronous one-way video communication interface and the representative user interface to another user.

The indication of the chat request can be received in response to selection of a chat request user interface element within a website visitor communication user interface. The chat request user interface element can be selectable by a website visitor only during a predetermined time period.

Some implementations can include a non-transitory computer readable medium having stored thereon software instructions that, when executed by one or more processors, cause the one or more processors to perform operations. The operations can include receiving an indication of a chat request from a website visitor, and causing a representative user interface to be displayed on a representative system. The operations can also include causing an asynchronous one-way video communication interface to be displayed to the website visitor, wherein the asynchronous one-way video communication interface permits the website visitor to provide text messages and does not require video messages from the website visitor, and receiving a text message from the asynchronous one-way video communication interface. The operations can further include displaying the text message on the representative user interface, and providing user interface control elements on the representative user interface to permit recording and transmitting of a video response to the text message. The operations can also include receiving a recorded video response to the text message from the representative user interface, and transmitting the recorded video response to the asynchronous one-way video communication interface. The operations can further include causing the recorded video response to be played on the asynchronous one-way video communication interface when the website visitor selects a user interface element to play the recorded video response in the asynchronous one-way video communication interface.

The operations can also include recording both sides of a conversation between the asynchronous one-way video communication interface and the representative user interface. The recording can be initiated in response to selection of a user interface element corresponding to recording the conversation. The recording can be initiated automatically when the conversation begins. The operations can further include providing a user interface control to permit the representative user interface to transmit a link to the recording of both sides of the conversation between the asynchronous one-way video communication interface and the representative user interface to another user.

The indication of the chat request can be received in response to selection of a chat request user interface element within a website visitor communication user interface. The chat request user interface element can be selectable by a website visitor only during a predetermined time period.

DETAILED DESCRIPTION

Figure 1:
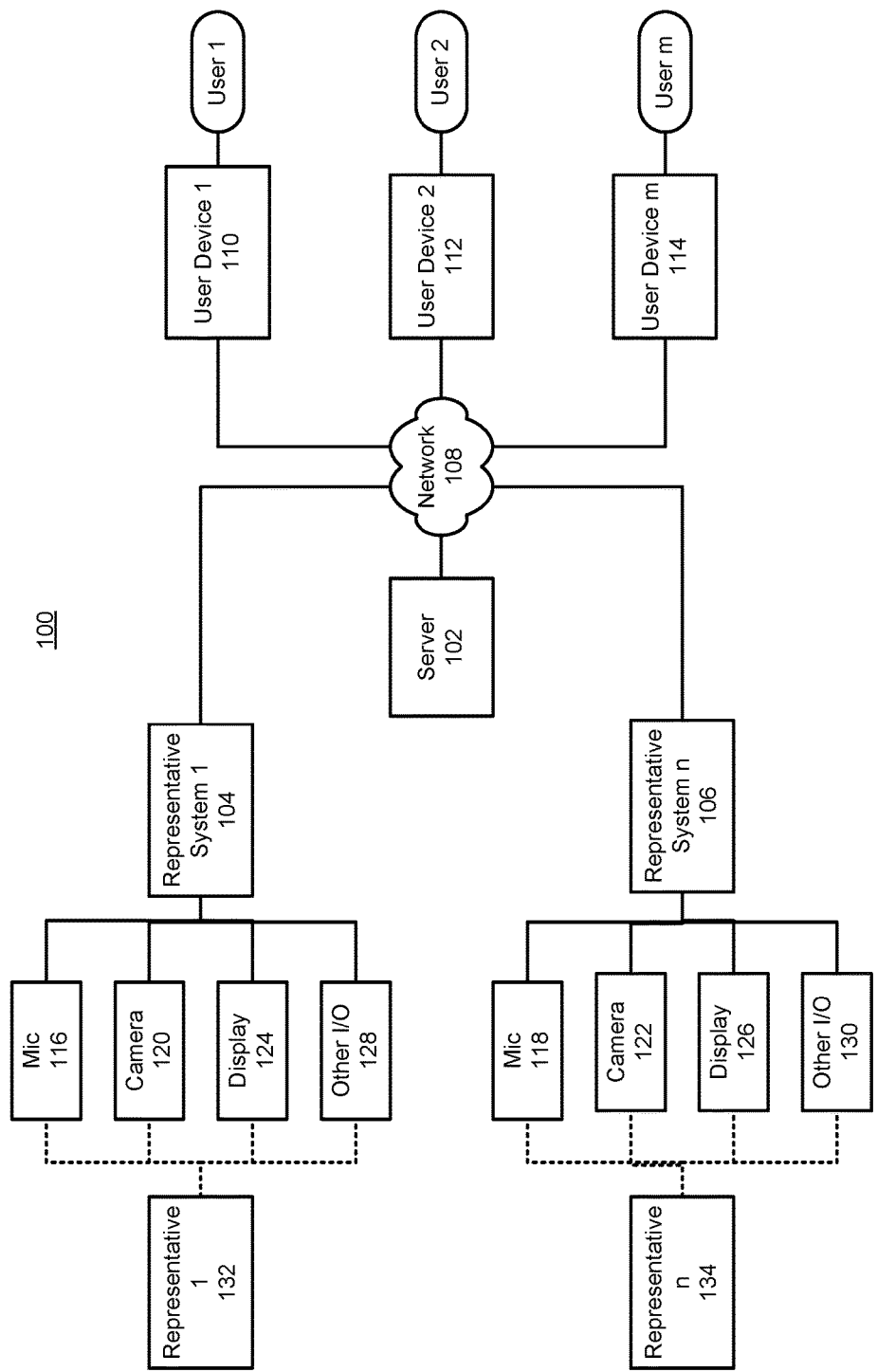
FIG. 1 is a block diagram of example systems and a network environment which may be used for one or more implementations described herein.

The systems and methods provided herein may overcome one or more deficiencies of some conventional website visitor communications systems and methods. For example, website visitors may wish to receive information or answers to specific questions while remaining anonymous. On the other hand, businesses or other entities may wish to engage website visitors and provide visitors with a positive impression and a sense of a "real" person to answer questions or provide information. Website representatives may wish to have a single representative be able to interact with multiple visitors simultaneously. Conventional websites may provide two-way text chat capabilities, which may provide the multiplex capability between a representative and a plurality of visitors, but may limit the degree of engagement that an entity may wish to establish. Some conventional system may provide two-way video chatting, which may provide a more personal, engaging experience for connecting with visitors, but may be too invasive or may reduce privacy and/or anonymity and thus may discourage a website visitor from engaging with the website entity, and may not permit a single representative from carrying out multiple chat sessions simultaneously.

The example systems and methods described herein may overcome one or more of the deficiencies of conventional website visitor communication systems to provide website representatives with an asynchronous one-way outbound video channel and an inbound text channel. A technical problem of some conventional website visitor communication systems may be that such systems do not permit a website to establish an asynchronous one-way video chat session with a website visitor. Further, conventional website visitor communication systems may not permit one representative to interact with multiple visitors.

On the user (or website visitor) side, some implementations can include technologies such as WebRTC, Javascript, HTML, CSS, AJAX, etc. When a page from the website loads on the visitor's browser, code for the page can initialize javascript code to load and build a popup and set a timer for it. On initialization, the popup checks if there is a current chat session with the server. If so, it retrieves the most recent message and video response (if one has been sent). If no chat has been started, the popup will appear after a delay of several seconds.

When the popup first appears, it will prompt the user for the user's name and first message. When the user submits a response message, the Javascript code submits this response message to a remote server to log the message. This is repeated for each subsequent message the user sends.

The javascript code that was loaded at the user machine can start to "poll" the server when the user starts their session by submitting their first message (or when the popup is loaded and a current session is detected). This polling checks the server (e.g., every few seconds) for a new video response.

When the Javascript code that pings the remote server on its "poll" detects a new video response, it will load the new video response into the popup for display to the user. At any point the user can click to "close" the chat session. Doing so will submit to the remote server to mark this session as "ended" and minimizes the popup.

On the representative (or representative) side, technologies used can include WebRTC, Ruby, Ruby on Rails, Javascript, HTML, CSS, AJAX, etc. On initial sign in the representative dashboard can begin a "polling" process to periodically check for new or ongoing chat sessions. The server does this by using AJAX requests to asynchronously (without refreshing the page) check for the instant a new chat appears. When a new chat message is detected in the database (having been submitted remotely by the popup) the dashboard adds the active chat to the list of ongoing chats. This update process will also show the name, IP address, and time of last message from the user.

When the representative clicks on a chat in the list of active chats, the dashboard loads the full message log (history) for that chat below the recording screen. This gives the representative context and history of the conversation. The representative can then click to start recording a video using Web Real-Time Communication (WebRTC), which accesses the representative's webcam using their browser (WebRTC is the technology that allows this).

When the video is recorded, it is submitted to the server through an HTTP POST from WebRTC (and the representative's browser). The server receives the video, encodes it, and stores it on the server. It also stores a link to this video file in the database, which corresponds to the chat message (the user's message), thereby creating a "pair" of the message and the video.

The representative can then click to "preview" or "playback" and play the video or "send the response," which will deliver the video link to the user. This delivery is not actually done by the server sending the data to the user's browser but instead the data is marked as "ready" in the database and the "polling" process that takes place on the user's popup detects that a new video response is "ready". This process repeats until the dashboard "polling" process detects that a chat session has been closed or ended.

FIG. 1 illustrates a block diagram of an example environment 100, which may be used in some implementations described herein. In some implementations, environment 100 includes one or more server systems, e.g., server system 102 in the example of FIG. 1. Server system 102 can communicate with a network 108, for example. Server system 102 can include a server processing device and a database or other storage device. Environment 100 also can include one or more representative systems, e.g., representative systems 104 and 106, which may communicate with each other and/or with server system 102 via network 108. Network 108 can be any type of communication network, including one or more of the Internet, local area networks (LAN), wireless networks, switch or hub connections, etc. In some implementations, network 108 can include peer-to-peer communication between devices, e.g., using peer-to-peer wireless protocols.

For ease of illustration, FIG. 1 shows one block for server system 102, and shows two blocks for representative systems 104 and 106, and three blocks for user devices 110, 112, and 114. Server block 102 may represent multiple systems, server devices, and network databases, and can be provided in different configurations than shown. For example, server system 102 can represent multiple server systems that can communicate with other server systems via the network 108. In some examples, a database and/or other storage devices can be provided in server system block(s) that are separate from the server and can communicate with the server and other server systems via network 108. Also, there may be any number of representative systems and/or user devices. Each representative system and user device can be any type of electronic device, e.g., desktop computer, laptop computer, portable or mobile device, camera, cell phone, smart phone, tablet computer, television, TV set top box or entertainment device, wearable devices (e.g., display glasses or goggles, head-mounted display (HMD), wristwatch, headset, armband, jewelry, etc.), virtual reality (VR) and/or augmented reality (AR) enabled devices, personal digital assistant (PDA), media player, game device, etc. Some representative devices and/or user devices may also have a local database similar or other storage. In other implementations, environment 100 may not have all of the components shown and/or may have other elements including other types of elements instead of, or in addition to, those described herein.

In various implementations, end-users U1, U2, and Um may communicate with one or more representatives 132 and 134 via server system 102 using respective client devices 110, 112, and 114. For example, respective client devices 110, 112, and 114 may communicate data to and from one or more server systems (e.g., system 102). In some implementations, the server system 102 may provide appropriate data to the client devices such that each client device can receive communicated content or shared content uploaded to the server system 102 and/or network service. In some examples, the users can interact via audio or video conferencing, audio, video, or text chat, or other communication modes or applications. In some examples, the network service can include any system allowing users to perform a variety of communications, receive various forms of data, and/or perform socially-related functions. For example, the network service can permit a representative to send messages to particular or multiple other users, form social links in the form of associations to other users within the network service, group other users in user lists, friends lists, or other user groups, post or send content including text, images, image compositions, audio sequences or recordings, or other types of content for access by designated sets of users of the network service, participate in live video, audio, and/or text videoconferences or chat with other users of the service, etc.

In some implementations, a "user" can include one or more programs or virtual entities, as well as persons that interface with the system or network.

A user interface can enable display of images, video, text, audio, data, and other content on client device (e.g., a representative system and/or a user device) or alternatively on server system 102 or 202. Such an interface can be displayed using software on the representative system or user device, software on the server device, and/or a combination of representative system or user device and server software executing on the server, e.g., representative system software or user device software in communication with server system 102. The user interface can be displayed by a display device of a client device or server device, e.g., a display screen, projector, etc. In some implementations, application programs running on a server system can communicate with a client device to receive user input at the client device and to output data such as visual data, audio data, etc. at the client device.

Various implementations of features described herein can use any type of system and/or service. Any type of electronic device can make use of features described herein. Some implementations can provide one or more features described herein on client or server devices disconnected from or intermittently connected to computer networks.

Figure 2:
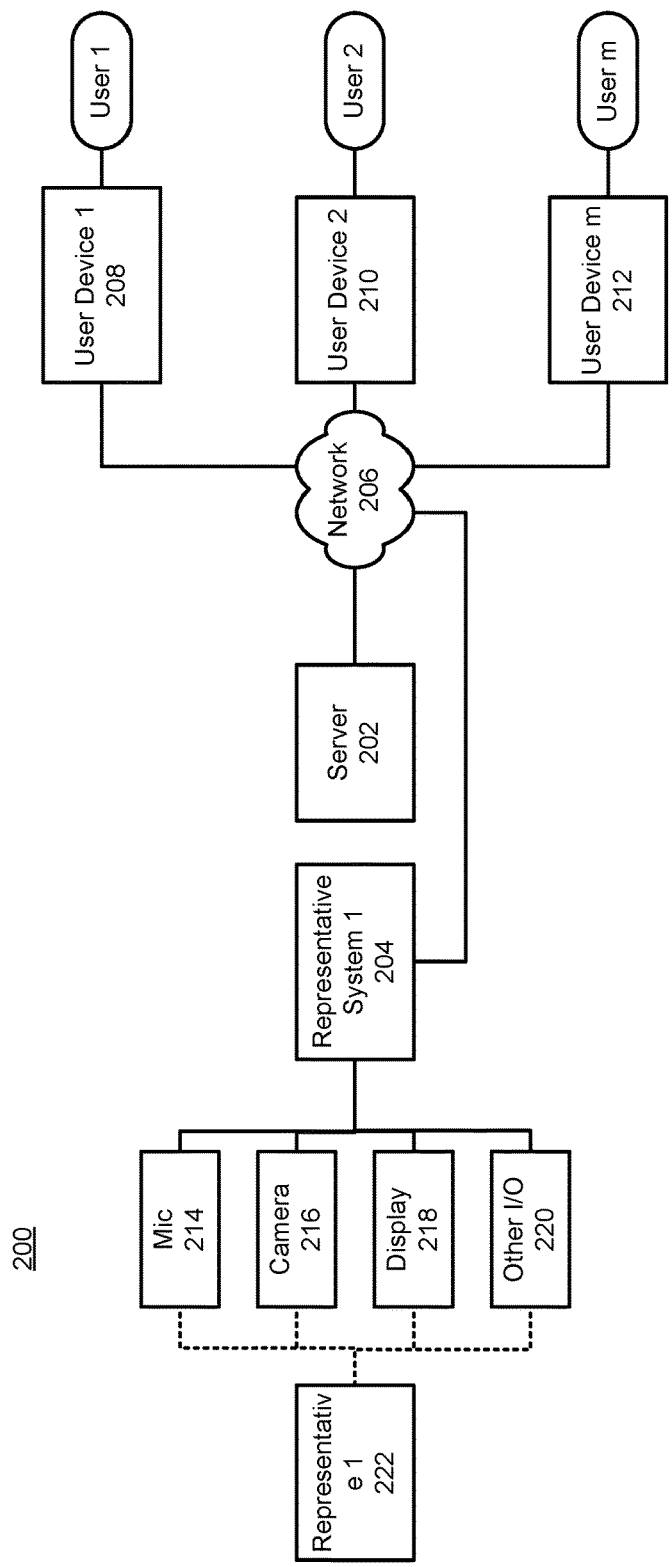
FIG. 2 is a block diagram of example systems and a network environment which may be used for one or more implementations described herein.

FIG. 2 shows an environment 200 that is a variation of environment 100 shown in FIG. 1. In the environment 200, a single representative 222 is able to conduct multiple one-way video chat sessions with a plurality of users or visitors (User 1-User m). The representative 222 is able to communicate via the representative system 204, which can include a microphone 214, a camera 216, a display 218 and I/O 220. The representative system is connected to a network 206. User (or visitor) devices 208-212 are connected to the network. The representative system and associated elements, the server 202, the network 206 and the user devices 208-212 are similar to devices with the same name as described above in connection with FIG. 1.

The plurality of visitors (User 1-User m) can be visiting the same or different websites. A representative can carry on multiple conversations with different visitors, each visiting and connecting from a different website.

Figure 3:
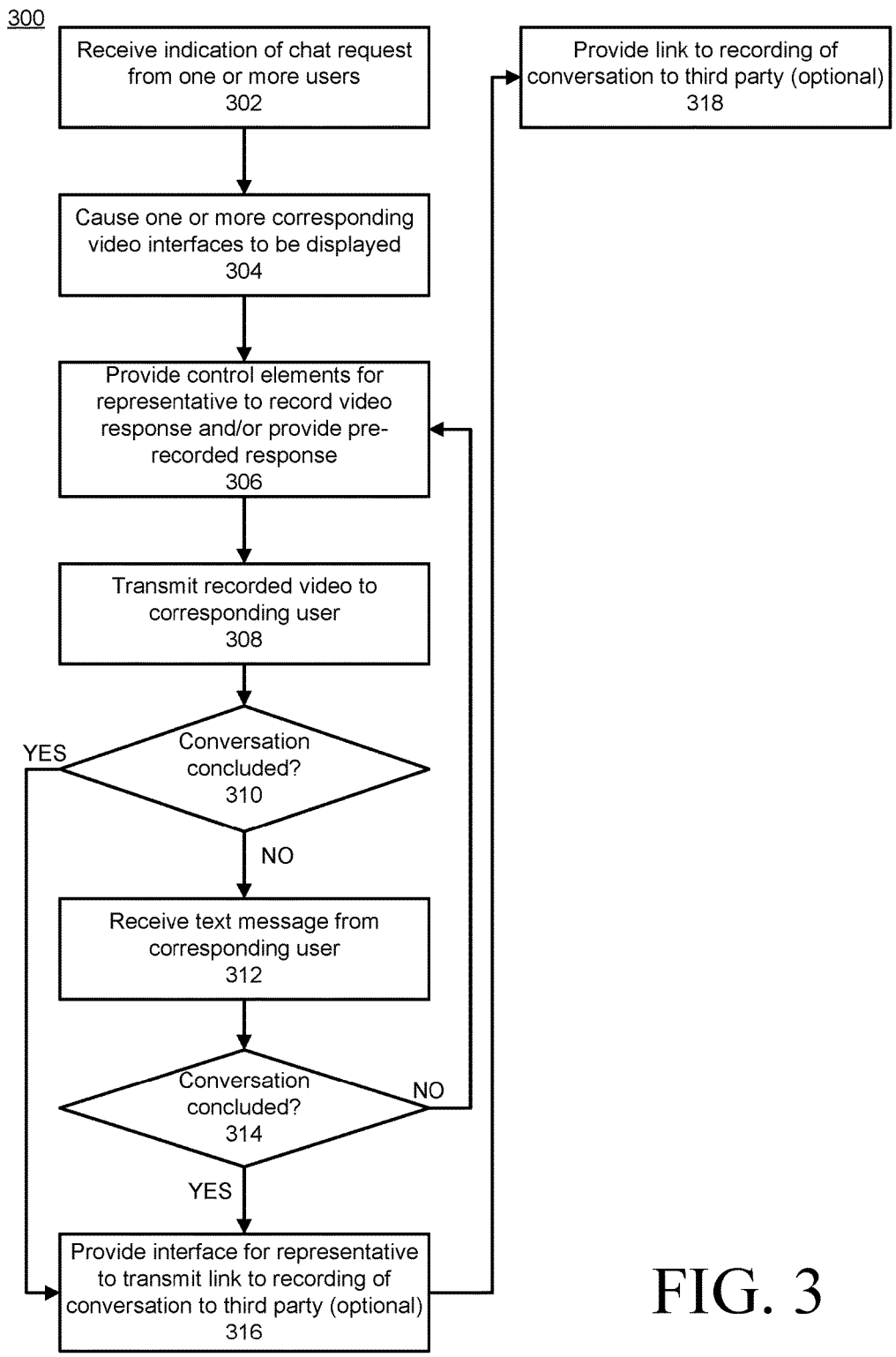
FIG. 3 is a flow diagram illustrating an example method to provide a website visitor communication system having an asynchronous one-way outbound video channel and an inbound text channel, according to some implementations.

FIG. 3 is a flow diagram illustrating an example method 300 to provide a website visitor communication system having an asynchronous one-way outbound video channel and an inbound text channel, according to some implementations.

In some implementations, method 300 can be implemented, for example, on a server system 102 as shown in FIG. 1. In other implementations, some or all of the method 300 can be implemented on one or more representative systems 104 and 106 as shown in FIG. 1, one or more server devices, and/or on both server device(s) and representative system(s). In described examples, the implementing system includes one or more digital hardware processors or processing circuitry ("processors"), and one or more storage devices (e.g., a database or other storage coupled to the server 102). In some implementations, different components of one or more servers and/or clients can perform different blocks or other parts of the method 300.

Some implementations can initiate method 300 based on user input (e.g., a chat request from a website visitor). A user may, for example, have selected the initiation of the method 300 from a user interface element displayed on a website (e.g., 904 of FIG. 9). In some implementations, method 300 or portions thereof can be performed with guidance by the user via user input and/or with guidance from the representative via representative input to a representative user interface.

In some implementations, the method 300, or portions of the method, can be initiated automatically by a device. For example, the method (or portions thereof) can be periodically performed, or performed based on the occurrence of one or more particular events or conditions. For example, such events or conditions can include a particular application being opened by a user, a certain action taken on a website user interface, a predetermined time period having expired since the last performance of method 300, and/or one or more other events or conditions occurring which can be specified in settings of a website implementing method 300. In some implementations, such conditions can be previously specified by a website representative in stored custom preferences of the website representative (accessible by a device or method with website representative consent). In some examples, a device (server or client) can perform the method 300 with access to information about products and/or services offered by the website representative. In another example, a camera, cell phone, tablet computer, wearable device, or other client device can capture one or more images (still images or video images) and can perform the method 300. In addition, or alternatively, a representative system can send one or more captured images to a server over a network, and the server can process the images into communications messages according to method 300.

In block 302, an indication of a chat request is received from one or more users (e.g., one or more visitors to one or more corresponding websites), e.g., via selection of 1002. The chat requests can originate from the same website or different websites. Processing continues to 304.

At 304, one or more asynchronous one-way video chat user interface screens (e.g., 400 shown in FIG. 4) are displayed for a representative to chat with a website visitor. On the visitor's side (e.g., at the user device), a user interface (e.g., 700 shown in FIG. 7, or 1102 in FIG. 11) is displayed. Processing continues to 306.

At 306, user interface controls for recording video responses (e.g., 406, 408) and for transmitting video responses (e.g., 412) are provided on the representative interface. Alternatively, the representative interface can include an element, selectable by the operator or representative, to capture a short "live" video and transmit the live video to the user or site visitor. Processing continues to 308.

At 308, the video recorded by the representative is transmitted to the website visitor's computer system for display on the display device coupled to the website visitor's computer. Processing continues to 310.

At 310, it is determined whether the conversation has concluded or terminated. If the conversation has concluded, processing continues to 316, otherwise processing continues to 312.

At 312, a text message (or other type of message, e.g., 1104) is received from the website visitor (or user). The received message can be displayed on the representative user interface (e.g., in section 404 of FIG. 4). Processing continues to 314.

At 314, the system determines if the conversation has concluded. If the conversation has concluded, processing continues to 316, otherwise processing continues to 306.

At 316, an interface (e.g., similar to that shown in FIG. 5) is optionally provided to permit the representative to transmit a link to a recording or transcript of the conversation (including text messages from website visitor and video responses from the representative) to a third party (e.g., an entity different than the representative and the user (or website visitor). Based on input to the user interface for transmitting the link, the link can be transmitted. Processing continues to 318.

At 318, the link to a recording or transcript of the conversation is provided (e.g., sent to another system, sent as an email, sent as a text message, etc.).

In FIG. 3, various blocks (e.g., blocks 302-318) are illustrated as being performed sequentially. It will be appreciated however that these blocks may be re-arranged as convenient to suit particular embodiments and that these blocks or portions thereof may be performed concurrently in some embodiments. It will also be appreciated that in some examples various blocks may be eliminated, divided into additional blocks, and/or combined with other blocks.

Figure 4:
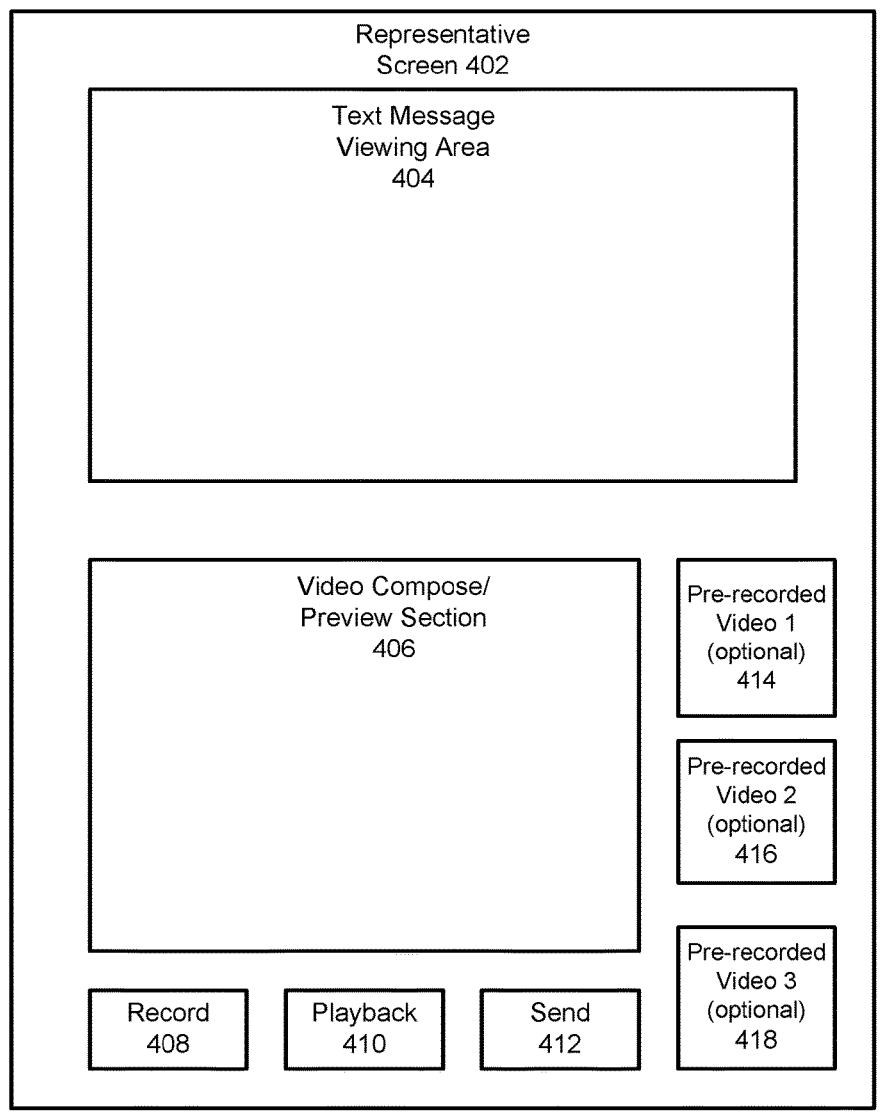
FIG. 4 is a diagrammatic illustration of an example of user interface for a representative within a website visitor communication system having an asynchronous one-way outbound video channel and an inbound text channel, according to some implementations.

FIG. 4 is a diagrammatic illustration of an example representative user interface 400 to carry on one way video chat sessions with a visitor to a website, according to some implementations. User interface 400 includes a representative screen 402 having a text message viewing area 404, a video composition/previewing area 406, a record button 408, a playback button 410, and a send button 412. The representative screen 402 can include buttons for transmitting prerecorded video responses (e.g., 414-418).

In operation, the user interface 400 can be used by a representative; representative or website chat service provider to perform some of the steps in FIG. 3. For example, the chat request may include an initial text message from a website visitor. The text messages from the visitor can be displayed in the text message viewing area 404. The text message viewing area 404 can also be optionally used to compose text messages to the visitor.

The representative can record a video message in response via the record button 408. The representative can preview the recorded video in the video compose/preview section 406 when the playback button 410 is pressed. If the representative is not satisfied with a recorded video, the representative can select record to record a replacement video. Once the representative is satisfied with a recorded video, the representative can select the send button 412 to send the video response to the website visitor device for playback.

In different implementations, user interface 400 may include a variety of different user interface components (e.g., as illustrated in FIG. 4). In some implementations, one or more user interface components may be omitted or additional components not shown in FIG. 6 may be included.

Figure 5:
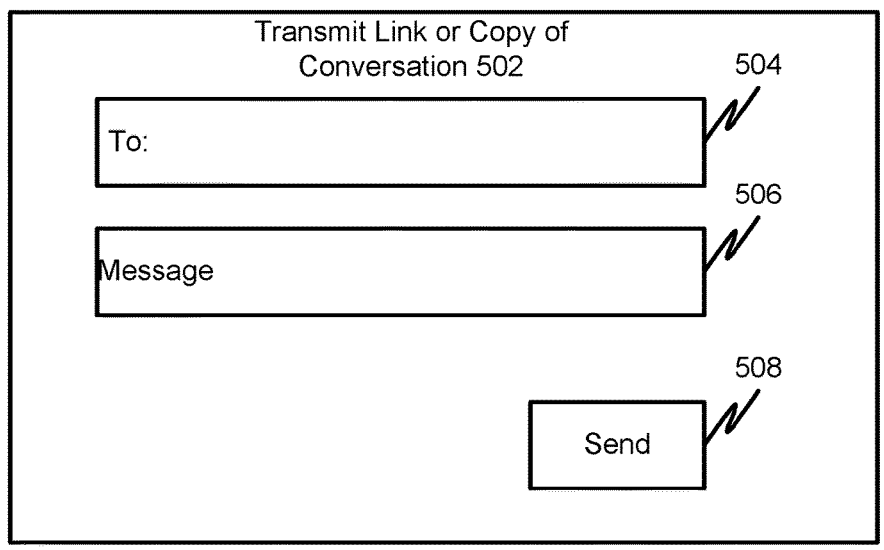
FIG. 5 is a diagrammatic illustration of an example of user interface for a representative within a website visitor communication system having an asynchronous one-way outbound video channel and an inbound text channel, according to some implementations.

FIG. 5 is a diagrammatic illustration of an example of user interface 500 for a representative within a website visitor communication system having an asynchronous one-way outbound video channel and an inbound text channel. The representative can provide a recipient in the "To:" element 504. The system can also provide an element 506 for entering a message to accompany the package. Finally, the interface 500 includes a send button to cause a message with a copy of the conversation (or a link to the content of the conversation) to be sent to the recipient(s) listed in 504. Once the message and files are attached, the message can be sent by pressing or selecting the Send button 508.

Figure 6:
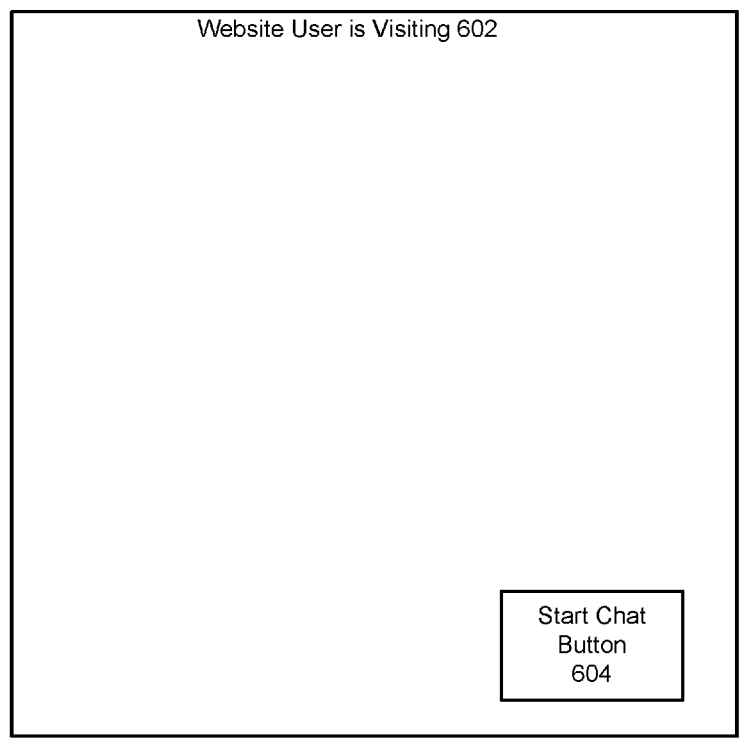
FIG. 6 is a diagrammatic illustration of an example of website visitor user interface within a website visitor communication system having an asynchronous one-way outbound video channel and an inbound text channel, according to some implementations.

FIG. 6 is a diagrammatic illustration of an example of website visitor user interface 600 within a website visitor communication system having an asynchronous one-way outbound video channel and an inbound text channel, according to some implementations. The website interface 602 can include a start chat button 604 that, when selected or pressed, causes an indication of a visitor requesting a chat session to be sent to one or more representatives within the website visitor communication system and can cause a chat interface (e.g., 704) to appear.

Figure 7:
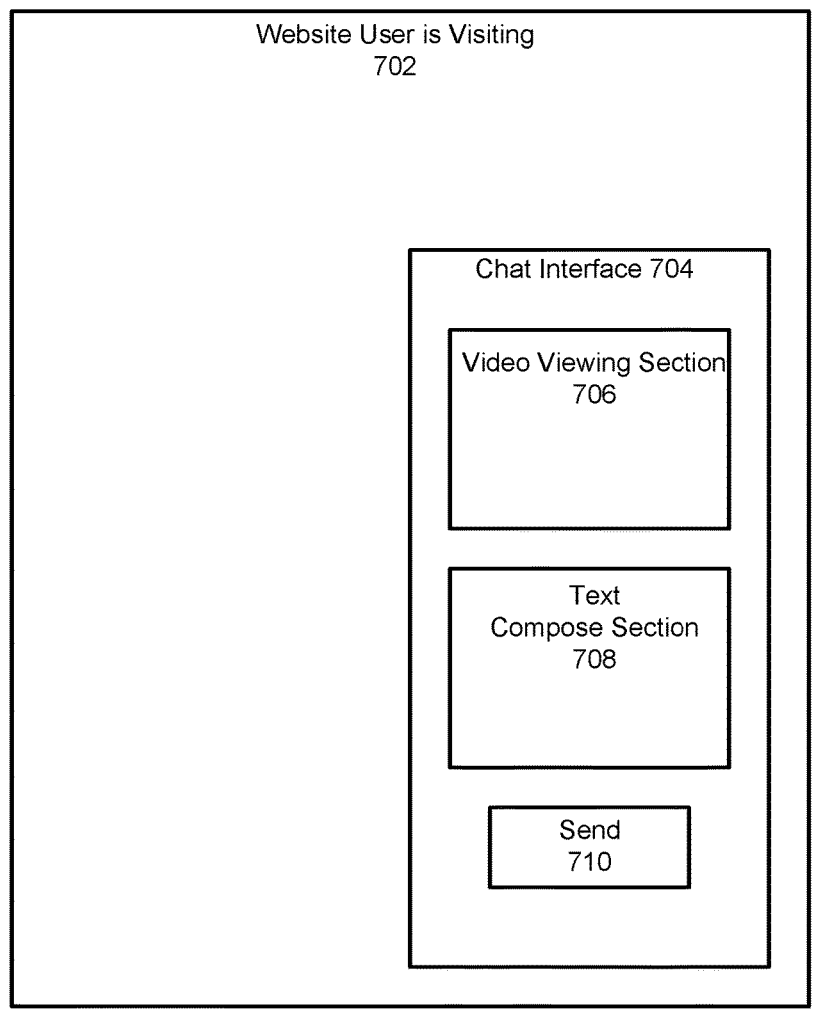
FIG. 7 is a diagrammatic illustration of an example of website visitor user interface within a website visitor communication system having an asynchronous one-way outbound video channel and an inbound text channel, according to some implementations.

FIG. 7 is a diagrammatic illustration of an example of website visitor user interface 700 within a website visitor communication system having an asynchronous one-way outbound video channel and an inbound text channel, according to some implementations. The user interface includes a website 702 the user is viewing. The user interface 700 also includes a chat interface 704, a video viewing section 706.

In operation, once a website visitor selects the start chat button 604, the chat interface 704 can be displayed, which includes a video viewing area 706, a text message compose screen 708, and the send button 710.

Figure 8:
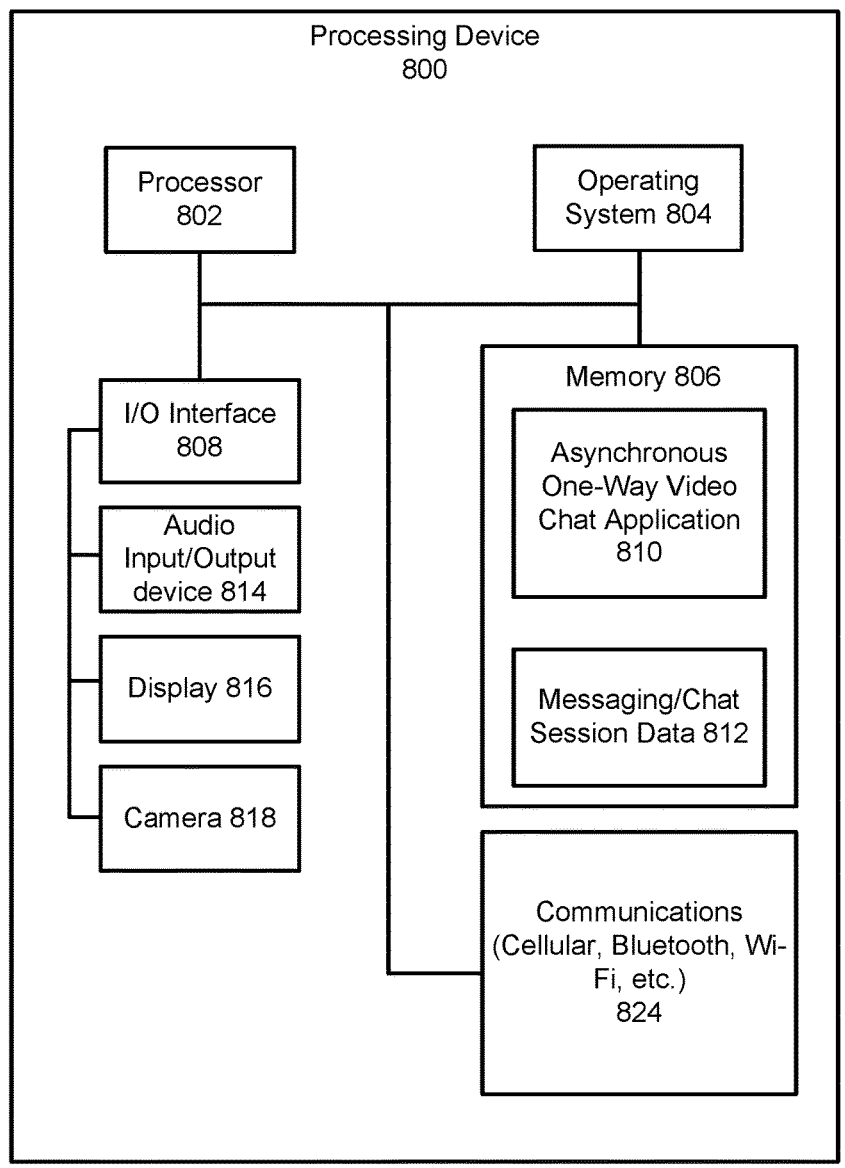
FIG. 8 is a block diagram of an example computing device which may be used for one or more implementations described herein.

FIG. 8 is a block diagram of an example processing device 800 which may be used to implement one or more features described herein. In one example, device 800 may be used to implement a computer device, e.g., a server device (e.g., server device 102 of FIG. 1 and/or server 202 of FIG. 2), and perform appropriate method implementations described herein (e.g., one or more of 302-318). Device 800 can be any suitable computer system, server, or other electronic or hardware device. For example, the device 800 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 800 includes a processor 802, an operating system 804, a memory 806, and input/output (I/O) interface 808.

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times, at different locations[,] and/or by different (or the same) processing systems. A computer may be any processor in communication with a memory.

Memory 806 is typically provided in device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 806 can store software operating on the server device 800 by the processor 802, including an operating system 804, one or more applications 810, and messaging/chat session data 812. In some implementations, applications 810 can include instructions that enable processor 802 to perform the functions described herein, e.g., some or all of the method of FIG. 3.

For example, applications 810 can include a website visitor communication application, which as described herein can provide an asynchronous one-way video communication output channel and a text input channel and other functions, e.g., providing displayed user interfaces responsive to user input to display user-selectable elements.

Other applications or engines 814 can also or alternatively be included in applications 810, e.g., email applications, SMS and other phone communication applications, web browser applications, media display applications, communication applications, web hosting engine or application, social networking engine or application, etc. Any of software in memory 804 can alternatively be stored on any other suitable storage location or computer-readable medium. In addition, memory 804 (and/or other connected storage device(s)) can store images, video, and other instructions and data used in the features described herein. Memory 804 and any other type of storage (magnetic disk, optical disk, magnetic tape, or other tangible media) can be considered "storage" or "storage devices."

I/O interface 808 can provide functions to enable interfacing the server device 800 with other systems and devices. For example, network communication devices, storage devices (e.g., memory and/or database), and input/output devices can communicate via interface 808. In some implementations, the I/O interface 808 can connect to interface devices including input devices (keyboard, pointing device, touchscreen, microphone, camera, scanner, etc.) and/or output devices (display device, speaker devices, printer, motor, etc.). Audio input/output device 814 (e.g., microphone and speaker), display device 816 and camera device 818 are examples of input/output devices that may be used to capture input (microphone and/or camera) and to provide output (display and speaker). Display device 816 can be connected to device 800 via local connections (e.g., display bus) and/or via networked connections and can be any suitable display device, some examples of which are described below.

For ease of illustration, FIG. 8 shows one block for each of processor 802, memory 806, I/O interface 808, and software block 810. These blocks may represent one or more processors or processing circuitries, operating systems, memories, I/O interfaces, applications, and/or software modules. In other implementations, device 800 may not have all of the components shown and/or may have other elements including other types of elements instead of, or in addition to, those shown herein. While server system 102 is described as performing operations as described in some implementations herein, any suitable component or combination of components of system 102 or similar system, or any suitable processor or processors associated with such a system, may perform the operations described.

In some implementations, a new representative (or chat operator) is selected based on the number of logged in chat operators. The chat operators will see a list of "new" chats that are incoming. Representatives can respond once they see a "new chat" request. If there are multiple operators logged in, the operators can get assigned in a rotation or they all can see an incoming new chat and connect on a first come first serve basis.

An operator may be able to view users on the website based on their IP address. When a new chat has started (someone enters their first name and initial question), a button will pop-up for the chat operator that they can click and respond to.

A chat session can conclude either by the user or the operator. The chat session can be closed out using the chat/webpage or they can always push "end chat". Some implementations can include a button for the chat operators as well so that they can end a session. In some implementations, most of the time, the user will be the one in control.

An operator can send a website visitor a text message. For example, to provide a link (or URL), send quick information or when having technical difficulties with video.

In order to promote and encourage engagement, some implementations may just ask for a first name of a website visitor so that a representative will know how to address the visitor. Because of the video responses, a representative may have a chance to gather more info while the conversation continues on, so not as much information may be needed initially.

A representative system can also implement and/or be used with features described herein, e.g., representative systems 104 and 106 shown in FIG. 1. Example representative systems can be computer devices including some similar components as the device 800, e.g., processor(s) 802, memory 806, and I/O interface 808. An operating system, software and applications suitable for the client device can be provided in memory and used by the processor, e.g., website visitor communication software, etc. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device 816, for example, can be connected to (or included in) the device 800 to display video and/or text messages as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

Figure 9:
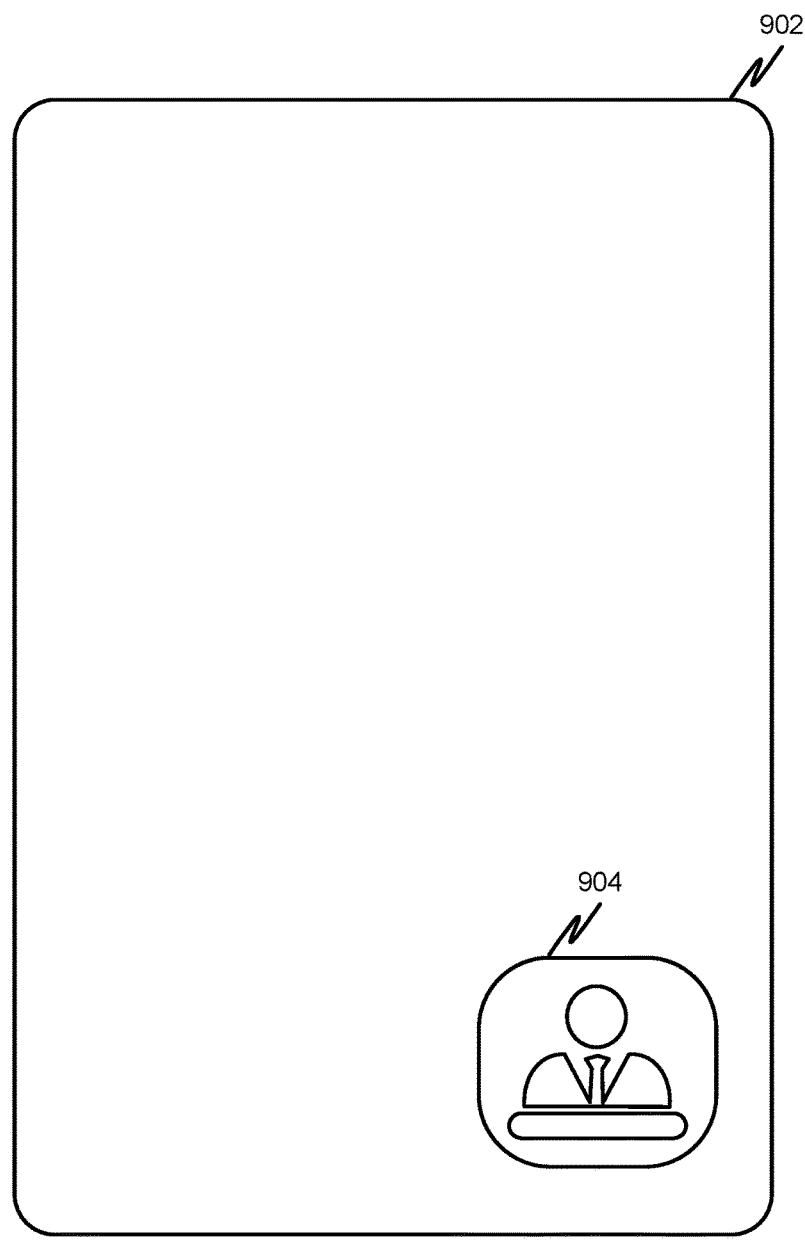
FIG. 9 is a diagrammatic illustration of an example of website visitor user interface within a website visitor communication system having an asynchronous one-way outbound video channel and an inbound text channel, according to some implementations.

FIG. 9 is a diagrammatic illustration of an example of website visitor user interface 902 within a website visitor communication system having an asynchronous one-way outbound video channel and an inbound text channel, according to some implementations. The interface 902 can include a user interface element 904 that, when selected, causes a user interface (e.g., interface 1000 in FIG. 10) with various communication options to be displayed.

Figure 10:
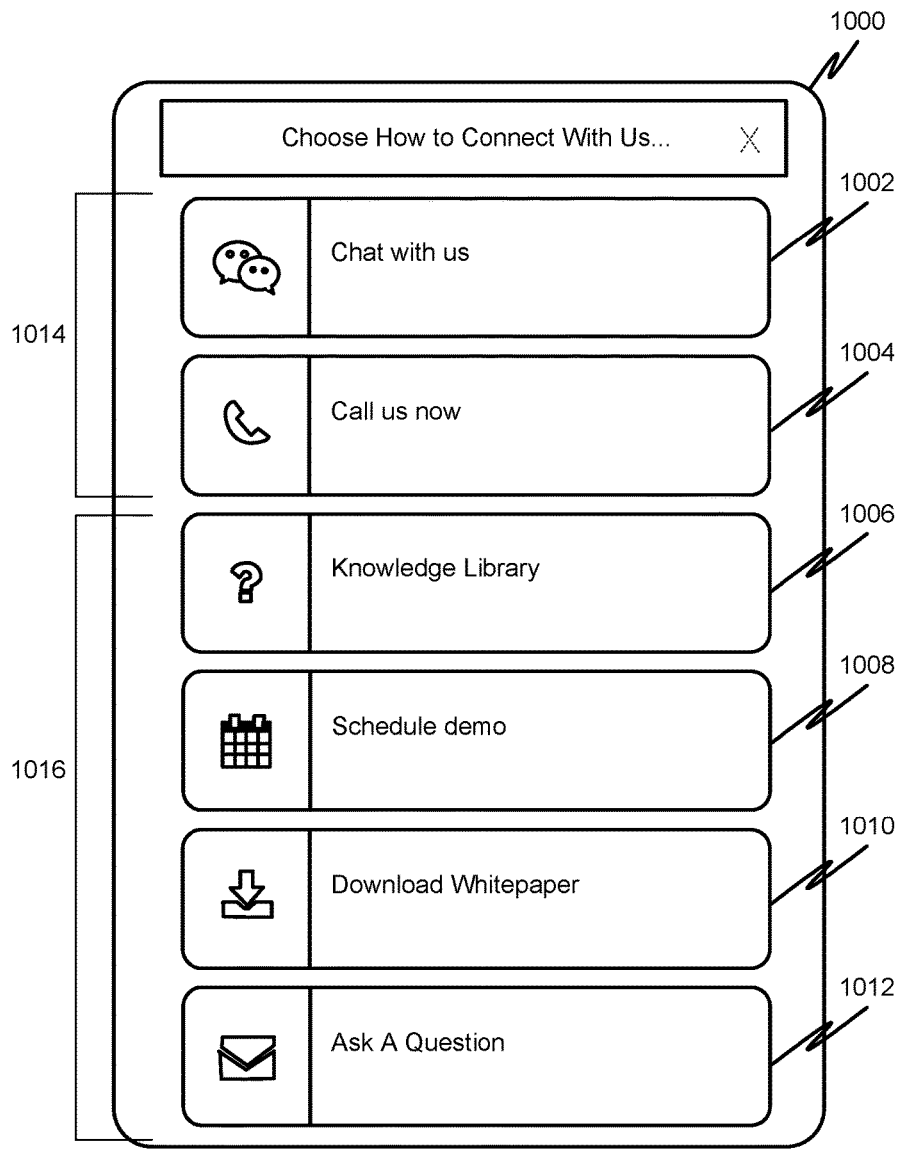
FIG. 10 is a diagrammatic illustration of an example of website visitor user interface within a website visitor communication system having an asynchronous one-way outbound video channel and an inbound text channel, according to some implementations.

FIG. 10 is a diagrammatic illustration of an example of website visitor user interface 1000 within a website visitor communication system having an asynchronous one-way outbound video channel and an inbound text channel, according to some implementations. The user interface 1000 includes a chat initiation element 1002, a call initiation element 1004, a knowledge library element 1006, a schedule demo element 1008, a download whitepaper element 1010, and an "Ask a Question" element 1012. In operation, the elements displayed within the user interface 1000 may be selectable by the operator of the website and may vary based on time of day.

The website communication system can include an option for selecting to enable or disable dynamic operation. Dynamic operation can dynamically vary which user interface elements are enabled or displayed on the user interface 1000 based on time of day, day of week, etc. For example, if dynamic operation is enabled, during a first time period (e.g., business hours, which are configurable by the website operator) a first group 1014 and a second group 1016 of user interface elements are displayed. During a second time period (e.g., non-business hours), only the second group of user interface elements 1016 are displayed. In this manner, the user interface elements corresponding to communication modes that require an immediate human response (e.g., video chat and phone call) may only be enabled when staff is present to respond in those communication modes.

Figure 11:
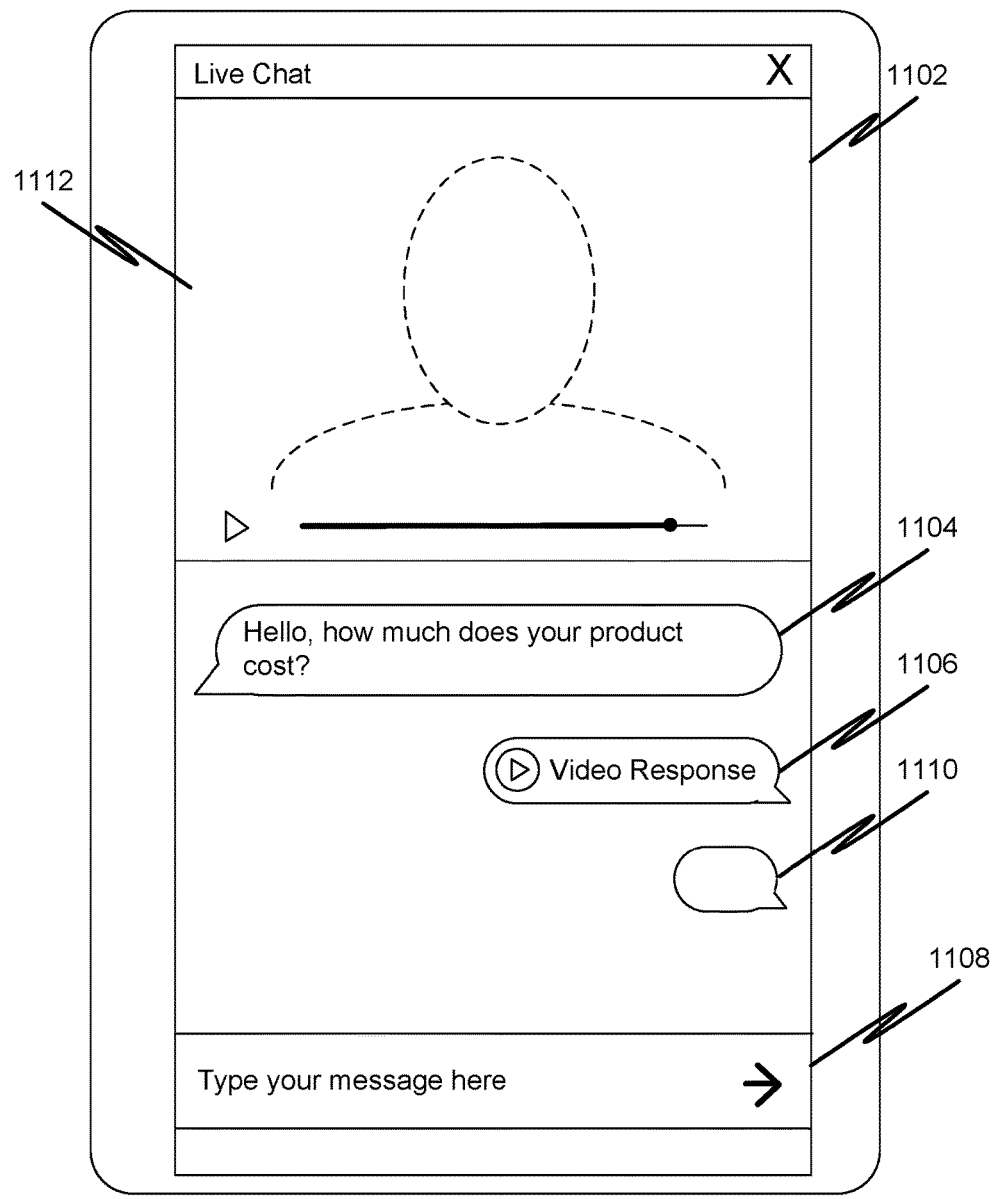
FIG. 11 is a diagrammatic illustration of an example of website visitor user interface within a website visitor communication system having an asynchronous one-way outbound video channel and an inbound text channel, according to some implementations.

FIG. 11 is a diagrammatic illustration of an example of website visitor user interface 1102 within a website visitor communication system having an asynchronous one-way outbound video channel and an inbound text channel, according to some implementations. For example, when the chat user interface element 1002 is selected, the user interface 1102 may be displayed to the website visitor. The user interface 1102 includes a first text message sent by a website visitor via the website communication interface 1102. The user interface includes a recorded video response 1106 in the conversation thread. The recorded video response 1106 is an example of a one-way asynchronous video communication provided by implementations described herein. The website visitor may select the video response 1106 to view the video response in the video area 1112 of the user interface 1102. The user interface 1102 can also include an indication 1110 that a representative is composing a message and can include a message compose area 1108 for the website visitor to use to compose messages to the representative.

One or more methods described herein (e.g., method 300) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc. In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a non-transitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering, image processing and/or machine vision arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for a website visitor communication system having an asynchronous one-way outbound video channel and an inbound text channel.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. A computer-implemented method to provide a website user communication system having an asynchronous one-way outbound video channel and an inbound text channel, the method comprising:
    receiving an indication of a chat request from a website user;
    causing a website representative user interface to be displayed on a website representative system;
    causing an asynchronous one-way video communication interface to be displayed to the website user, wherein the asynchronous one-way video communication interface permits the website user to send text messages to the website representative system and does not require the website user to send video messages;
    receiving a text message from the website user via the asynchronous one-way video communication interface;
    displaying the text message on the website representative system via the website representative user interface;
    providing user interface control elements on the website representative user interface to permit recording and transmitting of a video response to the text message from the website user;
    providing preview user interface control elements on the website representative user interface to permit playback of the video response to the text message from the website user;
    receiving a recorded video response from the website representative user interface to the text message from the website user;
    transmitting the recorded video response to the asynchronous one-way video communication interface displayed to the website user;
    causing the recorded video response to be played on the asynchronous one-way video communication interface displayed to the website user when the website user selects a user interface element to play the recorded video response from the website representative system in the asynchronous one-way video communication interface displayed to the website user; and
    recording both sides of a conversation between the asynchronous one-way video communication interface displayed to the website user and the website representative user interface displayed on the website representative system,
    wherein the website user communication system permits the website user to interact with the website representative system without sharing any website user identification details, wherein the website representative system communicates with the website user via one or more of text and video messages, and wherein the website representative system permits the website user to respond via text messages only.

2. The method of claim 1, wherein the recording is initiated in response to selection of a recording user interface element corresponding to the recording of the conversation.

3. The method of claim 1, wherein the recording is initiated automatically when the conversation begins.

4. The method of claim 1, further comprising providing a user interface control to permit the website representative user interface to transmit a link to the recording of both sides of the conversation between the asynchronous one-way video communication interface displayed to the website user and the website representative user interface displayed on the website representative system to another user.

5. The method of claim 1, wherein the indication of the chat request is received in response to selection of a chat request user interface element within the website user communication user interface displayed to the website user.

6. The method of claim 5, wherein the chat request user interface element is selectable by the website user only during a predetermined time period.

7. A website user communication system having an asynchronous one-way outbound video channel and an inbound text channel, the system comprising:
    one or more processors coupled to a non-transitory computer readable medium having stored thereon software instructions that, when executed by the one or more processors, cause the one or more processors to perform operations including:

receiving an indication of a chat request from a website user;

causing a website representative user interface to be displayed on a website representative system;

causing an asynchronous one-way video communication interface to be displayed to the website user, wherein the asynchronous one-way video communication interface permits the website user to send text messages to the website representative system and does not require the website user to send video messages;

receiving a text message from the website user via the asynchronous one-way video communication interface;

displaying the text message on the website representative system via the website representative user interface;

providing user interface control elements on the website representative user interface to permit recording and transmitting of a video response to the text message from the website user;

receiving a recorded video response from the website representative user interface to the text message from the website user;

transmitting the recorded video response to the asynchronous one-way video communication interface displayed to the website user;

causing the recorded video response to be played on the asynchronous one-way video communication interface displayed to the website user when the website user selects a user interface element to play the recorded video response from the website representative system in the asynchronous one-way video communication interface displayed to the website user; and recording both sides of a conversation between the asynchronous one-way video communication interface displayed to the website user and the website representative user interface displayed on the website representative system, wherein the website user communication system permits the website user to interact with the website representative system without sharing any website user identification details, wherein the website representative system communicates with the website user via one or more of text and video messages, and wherein the website representative system permits the website user to respond via text messages only.

8. The system of claim 7, wherein the recording is initiated in response to selection of a recording user interface element corresponding to the recording of the conversation.

9. The system of claim 7, wherein the recording is initiated automatically when the conversation begins.

10. The system of claim 7, wherein the operations further comprise providing a user interface control to permit the website representative user interface to transmit a link to the recording of both sides of the conversation between the asynchronous one-way video communication interface displayed to the website user and the website representative user interface displayed on the website representative system to another user.

11. The system of claim 7, wherein the indication of the chat request is received in response to selection of a chat request user interface element within a website user communication user interface displayed to the website user.

12. The system of claim 11, wherein the chat request user interface element is selectable by the website user only during a predetermined time period.

13. A non-transitory computer readable medium having stored thereon software instructions that, when executed by one or more processors, cause the one or more processors to perform operations for a website user communication system having an asynchronous one-way outbound video channel and an inbound text channel, the operations including:

receiving an indication of a chat request from a website user;

causing a website representative user interface to be displayed on a website representative system;

causing an asynchronous one-way video communication interface to be displayed to the website user, wherein the asynchronous one-way video communication interface permits the website user to send text messages to the website representative system and does not require the website user to send video messages;

receiving a text message from the website user via the asynchronous one-way video communication interface;

displaying the text message on the website representative system via the website representative user interface;

providing user interface control elements on the website representative user interface to permit recording and transmitting of a video response to the text message from the website user;

providing preview user interface control elements on the website representative user interface to permit playback of the video response to the text message from the website user;

receiving a recorded video response from the website representative user interface to the text message from the website user;

transmitting the recorded video response to the asynchronous one-way video communication interface displayed to the website user; and causing the recorded video response to be played on the asynchronous one-way video communication interface displayed to the website user when the website user selects a user interface element to play the recorded video response from the website representative system in the asynchronous one-way video communication interface displayed to the website user, wherein the website user communication system permits the website user to interact with the website representative system without sharing any website user identification details, wherein the website representative system communicates with the website user via one or more of text and video messages, and wherein the website representative system permits the website user to respond via text messages only.

14. The non-transitory computer readable medium of claim 13, wherein the operations further comprise recording both sides of a conversation between the asynchronous one-way video communication interface displayed to the website user and the website representative user interface displayed on the website representative system.

15. The non-transitory computer readable medium of claim 14, wherein the recording is initiated in response to selection of a recording user interface element corresponding to the recording of the conversation.

16. The non-transitory computer readable medium of claim 14, wherein the recording is initiated automatically when the conversation begins.

17. The non-transitory computer readable medium of claim 14, wherein the operations further comprise providing a user interface control to permit the website representative user interface to transmit a link to the recording of both sides of the conversation between the asynchronous one-way video communication interface displayed to the website user and the website representative user interface displayed on the website representative system to another user.

18. The non-transitory computer readable medium of claim 13, wherein the indication of the chat request is received in response to selection of a chat request user interface element within a website user communication user interface displayed to the website user.

19. The non-transitory computer readable medium of claim 18, wherein the chat request user interface element is selectable by the website user only during a predetermined time period.

* * * * *